United States Patent
Shin et al.

(10) Patent No.: US 9,471,217 B2
(45) Date of Patent: Oct. 18, 2016

(54) DISPLAY MANAGEMENT METHOD AND SYSTEM OF MOBILE TERMINAL

(75) Inventors: Seung Woo Shin, Seoul (KR); Bong Won Lee, Seoul (KR); In Won Jong, Seoul (KR); Paihonensami Viktor, Kempele (FI)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 768 days.

(21) Appl. No.: 12/766,984

(22) Filed: Apr. 26, 2010

(65) Prior Publication Data
US 2010/0299597 A1    Nov. 25, 2010

(30) Foreign Application Priority Data

May 19, 2009  (KR) ........................ 10-2009-0043442

(51) Int. Cl.
*G06F 3/0482* (2013.01)
*G06F 3/0488* (2013.01)
*G06F 3/00* (2006.01)
*A01D 41/127* (2006.01)
*G06F 19/00* (2011.01)
*G03B 17/40* (2006.01)
*G06T 13/00* (2011.01)

(52) U.S. Cl.
CPC ........... *G06F 3/0488* (2013.01); *G06F 3/0482* (2013.01); *A01D 41/127* (2013.01); *G03B 17/40* (2013.01); *G06F 19/321* (2013.01); *G06T 13/00* (2013.01)

(58) Field of Classification Search
CPC ............ G06F 17/30994; G06F 19/26; G06F 3/0482; G06F 19/321; G03B 17/40; G06T 13/00; A01D 41/127

USPC ............... 715/810, 828, 779, 838, 769, 766
See application file for complete search history.

(56) References Cited

U.S. PATENT DOCUMENTS

| | | | |
|---|---|---|---|
| 4,334,245 A * | 6/1982 | Michael | 348/581 |
| 5,008,755 A * | 4/1991 | Brain | 348/578 |
| 5,644,737 A * | 7/1997 | Tuniman et al. | 715/810 |
| 5,767,850 A * | 6/1998 | Ramanathan et al. | 715/797 |
| 6,295,647 B1 * | 9/2001 | Ramaswamy | 725/116 |
| 6,600,936 B1 | 7/2003 | Karkkainen et al. | |

(Continued)

FOREIGN PATENT DOCUMENTS

| CN | 1826575 A | 8/2006 |
|---|---|---|
| CN | 101316402 A | 12/2008 |

(Continued)

*Primary Examiner* — Ece Hur
(74) *Attorney, Agent, or Firm* — Cha & Reiter, LLC.

(57) ABSTRACT

A display management method and system of a mobile terminal that provides the user with indications of the currently running applications and activation and deactivation progresses of the applications. A first execution screen of a first application is displayed, and an input signal is detected for activating a second application. A second execution screen is displayed corresponding to the second application in response to the input signal. The second execution screen includes at least one of a first intermediate image obtained by downsizing an image contained within the first execution screen, a second intermediate image obtained by downsizing an image contained within the second execution screen, and a task window containing at least the downsized first and second intermediate images in a sequential order.

17 Claims, 6 Drawing Sheets

(56) References Cited

U.S. PATENT DOCUMENTS

| | | | |
|---|---|---|---|
| 6,756,999 B2* | 6/2004 | Stoakley et al. | 715/779 |
| 7,115,824 B2* | 10/2006 | Lo | 200/61.52 |
| 7,346,855 B2* | 3/2008 | Hellyar et al. | 715/783 |
| 7,673,255 B2* | 3/2010 | Schechter et al. | 715/838 |
| 7,681,143 B2* | 3/2010 | Lindsay et al. | 715/788 |
| 7,739,617 B2* | 6/2010 | Ording et al. | 715/790 |
| 7,761,173 B2* | 7/2010 | Ehrlich | 700/83 |
| 8,069,421 B2* | 11/2011 | Dulaney | 715/838 |
| 8,149,214 B2* | 4/2012 | Cho et al. | 345/158 |
| 8,214,739 B2* | 7/2012 | Yoritate et al. | 715/716 |
| 8,214,760 B2* | 7/2012 | Matthews et al. | 715/795 |
| 8,291,344 B2* | 10/2012 | Chaudhri | 715/838 |
| 8,490,019 B2* | 7/2013 | Jarrett et al. | 715/838 |
| 8,566,697 B2* | 10/2013 | Meredith et al. | 715/205 |
| 8,589,374 B2* | 11/2013 | Chaudhri | 707/706 |
| 8,648,823 B2* | 2/2014 | Koch et al. | 345/173 |
| 8,698,845 B2* | 4/2014 | Lemay | 345/659 |
| 8,766,928 B2* | 7/2014 | Weeldreyer et al. | 345/173 |
| 8,806,369 B2* | 8/2014 | Khoe et al. | 715/808 |
| 2002/0163545 A1 | 11/2002 | Hii | 345/838 |
| 2003/0018714 A1* | 1/2003 | Mikhailov et al. | 709/203 |
| 2003/0083106 A1 | 5/2003 | Seo | |
| 2003/0117440 A1 | 6/2003 | Hellyar et al. | |
| 2004/0130540 A1 | 7/2004 | Sekiguchi et al. | |
| 2004/0201715 A1* | 10/2004 | Ishimura et al. | 348/220.1 |
| 2005/0022138 A1* | 1/2005 | Tunney | 715/827 |
| 2005/0108655 A1* | 5/2005 | Andrea et al. | 715/798 |
| 2005/0275632 A1* | 12/2005 | Pu et al. | 345/171 |
| 2006/0088105 A1* | 4/2006 | Shen et al. | 375/240.21 |
| 2006/0112354 A1* | 5/2006 | Park et al. | 715/835 |
| 2006/0121939 A1* | 6/2006 | Anwar et al. | 455/556.2 |
| 2006/0156254 A1* | 7/2006 | Satake | 715/838 |
| 2006/0242602 A1* | 10/2006 | Schechter et al. | 715/838 |
| 2006/0248404 A1* | 11/2006 | Lindsay et al. | 714/38 |
| 2006/0248471 A1* | 11/2006 | Lindsay et al. | 715/800 |
| 2006/0282679 A1* | 12/2006 | Nicholson et al. | 713/186 |
| 2007/0128899 A1* | 6/2007 | Mayer | 439/152 |
| 2007/0150810 A1 | 6/2007 | Katz et al. | |
| 2007/0152981 A1 | 7/2007 | Im et al. | |
| 2007/0171236 A1 | 7/2007 | Perttula | |
| 2007/0220445 A1 | 9/2007 | Yach et al. | |
| 2007/0250787 A1 | 10/2007 | Kawahara et al. | |
| 2007/0260999 A1* | 11/2007 | Amadio et al. | 715/804 |
| 2007/0290999 A1* | 12/2007 | Cho et al. | 345/158 |
| 2007/0300187 A1 | 12/2007 | Hama et al. | |
| 2008/0046100 A1* | 2/2008 | Balasubramanian | 700/17 |
| 2008/0109753 A1 | 5/2008 | Karstens | |
| 2008/0174570 A1* | 7/2008 | Jobs et al. | 345/173 |
| 2008/0177994 A1* | 7/2008 | Mayer | 713/2 |
| 2008/0282160 A1* | 11/2008 | Tonnison et al. | 715/704 |
| 2008/0307350 A1* | 12/2008 | Sabatelli et al. | 715/779 |
| 2009/0002335 A1* | 1/2009 | Chaudhri | 345/173 |
| 2009/0036108 A1 | 2/2009 | Cho | |
| 2009/0066647 A1* | 3/2009 | Kerr et al. | 345/158 |
| 2009/0172532 A1* | 7/2009 | Chaudhri | 715/702 |
| 2009/0193364 A1* | 7/2009 | Jarrett et al. | 715/838 |
| 2009/0228922 A1* | 9/2009 | Haj-Khalil et al. | 725/38 |
| 2009/0300542 A1* | 12/2009 | Duarte et al. | 715/800 |
| 2010/0039381 A1* | 2/2010 | Cretella et al. | 345/158 |
| 2010/0056223 A1* | 3/2010 | Choi et al. | 455/566 |
| 2010/0138773 A1* | 6/2010 | Schechter et al. | 715/779 |
| 2010/0231533 A1* | 9/2010 | Chaudhri | 345/173 |
| 2010/0304757 A1* | 12/2010 | Yoshioka | 455/456.1 |
| 2010/0328431 A1* | 12/2010 | Kim et al. | 348/46 |
| 2011/0065082 A1* | 3/2011 | Gal et al. | 434/365 |
| 2011/0074671 A1* | 3/2011 | Shimosato et al. | 345/156 |
| 2011/0126139 A1* | 5/2011 | Jeong et al. | 715/767 |
| 2011/0138295 A1* | 6/2011 | Momchilov et al. | 715/740 |
| 2011/0304769 A1* | 12/2011 | Kubota | 348/563 |
| 2012/0011464 A1* | 1/2012 | Hayashi et al. | 715/784 |
| 2013/0215153 A1* | 8/2013 | Park et al. | 345/650 |
| 2014/0362056 A1* | 12/2014 | Zambetti et al. | 345/179 |
| 2014/0375574 A1* | 12/2014 | Kim et al. | 345/173 |
| 2015/0022558 A1* | 1/2015 | Li | 345/650 |

FOREIGN PATENT DOCUMENTS

| | | | |
|---|---|---|---|
| EP | 1309157 | 5/2003 | H04M 1/247 |
| EP | 1 491 990 A2 | 12/2004 | |
| JP | 8-44253 A | 2/1996 | |
| JP | 2000-231371 A | 8/2000 | |
| JP | 2003-188973 A | 7/2003 | |
| JP | 2005-78145 A | 3/2005 | |
| JP | 2005-100199 A | 4/2005 | |
| JP | 2005-258762 A | 9/2005 | |
| JP | 2006-318479 | 11/2006 | G06F 3/048 |
| JP | 2006-323850 A | 11/2006 | |
| JP | 2007-183914 A | 7/2007 | |
| JP | 2007-526548 A | 9/2007 | |
| JP | 2009-25848 A | 2/2009 | |
| KR | 2002-087756 | 11/2002 | H04B 1/38 |
| KR | 2004-110116 | 12/2004 | H04B 1/40 |
| KR | 2006-101963 | 9/2006 | H04B 1/40 |
| KR | 10-2008-0039642 A | 5/2008 | |
| WO | WO 2007/024035 | 3/2007 | H04B 1/38 |

* cited by examiner

DISPLAY MANAGEMENT METHOD AND SYSTEM OF MOBILE TERMINAL

CLAIM OF PRIORITY

This application claims, pursuant to 35 USC 119(a), priority to, and the benefit of the earlier filing date of, that patent application entitled "DISPLAY MANAGEMENT METHOD AND SYSTEM OF MOBILE TERMINAL," filed in the Korean Patent Office on May 19, 2009 and afforded serial number 10-2009-0043442, the contents of which are incorporated by reference, herein.

BACKGROUND OF THE INVENTION

1. Field of the Invention

The present invention relates to a mobile terminal and, in particular, to a display management method and system of a mobile terminal for switching between user interfaces of applications.

2. Description of the Related Art

With the portability and extended usability features mobile terminals are becoming increasingly popular. Mobile terminals are provided with various types of input interfaces. One example of a mobile phone includes a keypad arranged on a side of its casing to allow a user to input alphanumeric characters. In another example, in order to secure a relatively large display area on the size-constrained mobile terminal, a touchscreen is becoming the substitution of the keypad.

In the current touchscreen-enabled mobile terminals, the touchscreen allows the user to execute applications and displays the execution screens of the application interactively. The user can be aware of the foreground running application with the application execution screen and input a command by touching an object on the touchscreen. However, the conventional touchscreen-enabled mobile terminal has a drawback in that, when multiple applications are running (e.g. multitasking) in the device simultaneously, only the execution screen of the foreground running application is displayed without any indications of other background running applications. As a consequence, the user is likely to be unaware of the background running applications.

SUMMARY OF THE INVENTION

The present invention provides a display management method and system of a mobile terminal that is capable of providing the user with indications of the currently running applications and activation and deactivation progresses of the applications in an intuitive and revealing manner especially when switching between the foreground running application and a user-selected background running application, whereby the user can perceive information about the running states of the applications and predict future operations.

In accordance with an exemplary embodiment of the present invention, a display management method of a mobile terminal includes displaying a first execution screen of a first application on a display; detecting an input signal for activating a second application; and displaying a second execution screen of the second application in response to the input signal, wherein displaying a second execution screen comprises presenting at least one of a first intermediate image obtained by downsizing the first execution screen, a second intermediate image obtained by downsizing the second execution screen, and a task window having thumbnail images obtained by downsizing the first and second intermediate images wherein the thumbnail images of the first and second intermediate images (and any other currently running applications) presented in the order of their execution.

In accordance with another exemplary embodiment of the present invention, a mobile terminal includes a display unit which displays an execution screen of an activated application; and a control unit which controls the displaying of a series of images to show a progress of switching between a first application running in foreground mode and a second application running in background mode selected in response to an input signal, wherein the display unit presents at least one of a first intermediate image obtained by downsizing a first execution screen, a second intermediate image obtained by downsizing a second execution screen, and a task window having thumbnail images obtained by downsizing the first and second intermediate images and presenting the thumbnail images of the first and second intermediate images (and any other currently running applications) in the order of their execution.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE INVENTION

Figure 1:
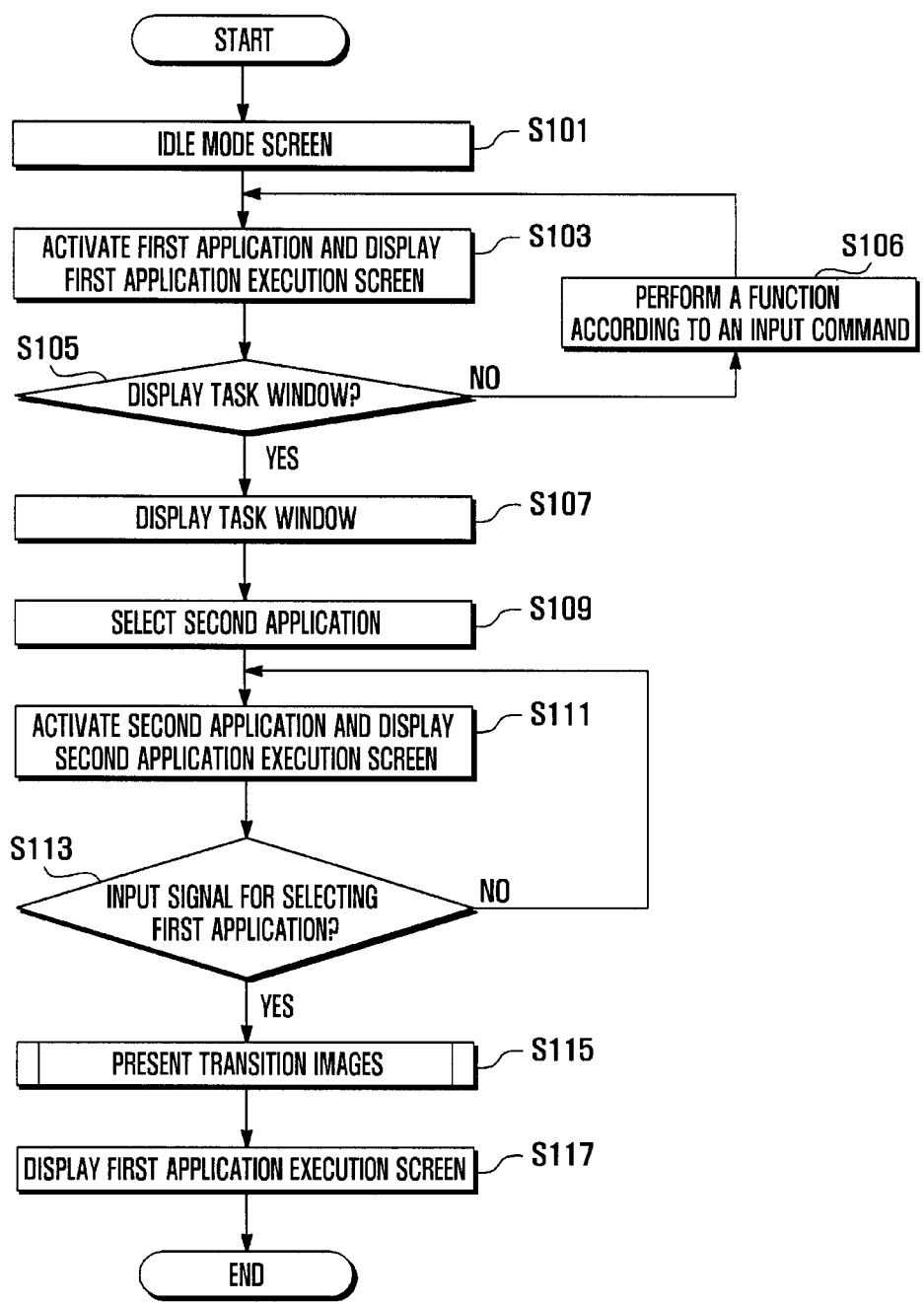
FIG. 1 is a flowchart illustrating a display management method of a mobile terminal according to an exemplary embodiment of the present invention.

Exemplary embodiments of the present invention are described in detail with reference to the accompanying drawings. The same reference numbers are used throughout the drawings to refer to the same or like parts. Detailed descriptions of well-known functions and structures incorporated herein may have been omitted to avoid obscuring the subject matter of the present invention.

Terms and words used in the specification and claims are to be regarded as concepts selected by the inventor as the best method of illustrating the present invention, and must be interpreted as having meanings and concepts adapted to the scope and sprit of the present invention to understand the technology of the present invention. Therefore, the exemplary embodiment described in the specification and the constructions illustrated in the drawings correspond to only the most preferable embodiment, but do not represent all of the technical spirit of the present invention. Accordingly, it should be understood that various equivalents and modifications can substitute for the illustrated examples of the invention presented at the time of filing of the present invention.

FIG. 1 is a flowchart illustrating a display management method of a mobile terminal according to an exemplary embodiment of the present invention.

Referring to FIG. 1, once the power is on, the mobile terminal initializes its configuration and displays a predetermined idle mode screen on a display unit (S101). The mobile terminal can be configured to display the idle mode screen when it turns on from a sleep mode. If the display unit turns on, the mobile terminal activates a touch panel to detect a touch event occurring thereon.

Next, the mobile terminal executes a first application in response to a user command as provided on the touch panel, for example, and displays the execution screen of the first application (S103). For example, a menu item or an icon designated as a phonebook application may be selected and an execution command is input by the user, wherein the mobile terminal executes the phonebook application and displays, on the display, the execution screen corresponding to the phonebook application stored by the user or received from another terminal or a server.

While displaying the execution screen of the first application, the mobile terminal monitors the input means to detect an input command for activating a task window (S105). If no input command is detected, the mobile terminal returns the procedure to step S103 to maintain displaying the execution screen of the first application. If an input command is detected but it is not the task window activation command, the mobile terminal can perform a function indicated by the input command (S106). The function can be a call function, messaging function, email function, and data edit function.

If the task window activation command (input by a touch event on a link image assigned to an area of the display unit or stroking a specific key of a keypad) is detected at step S105, the mobile terminal displays a task window (S107) on the screen in response to the task window activation command. Here, the touch event can be a double tapping or a long tapping. The task window can be a window presenting the first application screen displayed at step 103 in the form of a reduced-size image (hereinafter called downsized first application image). In case that no task window activation command is input, step 107 can be skipped.

The user can input an execution command for executing a second application after any of steps S103 and S107 (S109). That is, the user can execute the second application by means of a menu item or a hot key while the first application screen or the task window is displayed. If the execution command for executing the second application is detected, the mobile terminal executes the second application in response to the execution command and displays the execution screen of the second application (S111).

After displaying the second application execution screen, the mobile terminal monitors the input means to detect a user command (S113). If no user command is detected, the mobile terminal returns the procedure to step S111 to maintain displaying the second application execution screen. If a user command for controlling the second application is detected at step S113, the mobile terminal controls the second application in response to the control command and presents the control result with the second application screen.

If a user command for selecting the first application is detected at step S113, the mobile terminal performs an execution screen switching process (S115) and then displays the first application screen on the display in response to the first application selection command (S117). The execution screen switching process is described in detail with reference to FIGS. 2 to 5.

Figure 2:
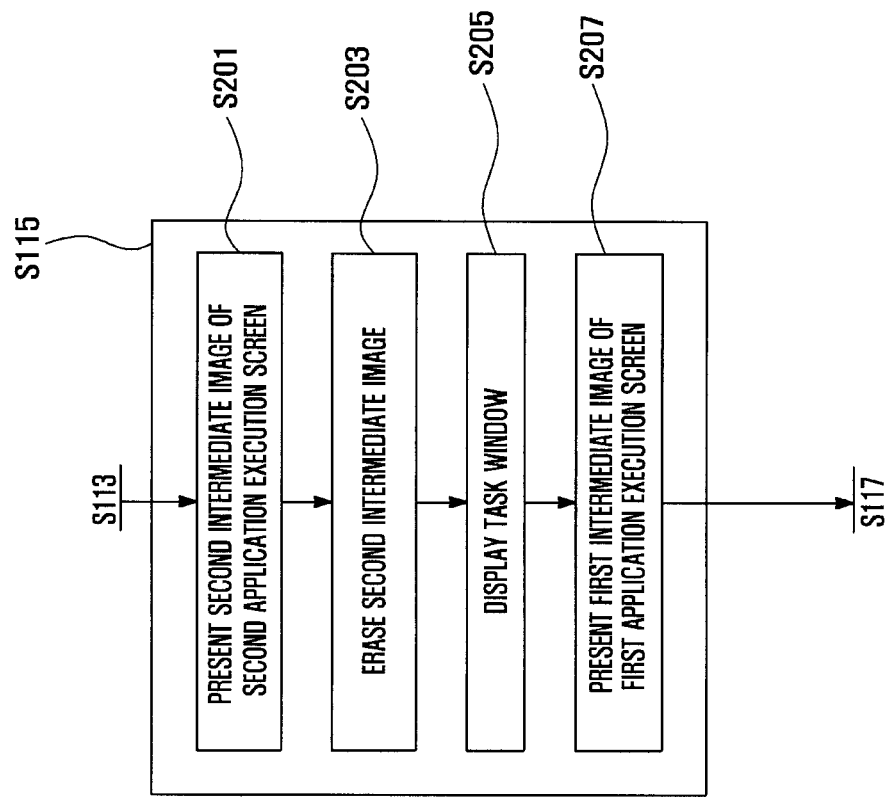
FIG. 2 is a flowchart illustrating steps of the execution screen switching process of FIG. 1.

FIG. 2 is a flowchart illustrating steps of the execution screen switching process of FIG. 1.

Referring to FIG. 2, if the first application selection command is detected at step 113 of FIG. 1, the mobile terminal processes the second application execution screen into a downsized image according to a preset downsized proportion and displays the downsized second application image on the display (S201). At this time, the mobile terminals can downsize all of the objects included in the second application execution screen in identical proportion and then display the downsized second application image for a predetermined time interval or create the downsized second application image based on the second application execution screen and display the downsized second application image for a predetermined time interval in replacement of the second application execution screen.

After the predetermined time interval has elapsed, the mobile terminal controls such that the downsized second application image disappear from the display (S203). Next, the mobile terminal controls the processing such that the task window appears on the display for a predetermined time interval (S205). After the predetermined time interval has elapsed, the mobile terminal controls the processing such that the downsized first application image appears on the display for a predetermined time interval (S207). After the predetermined time interval has elapsed, the mobile terminal controls processing such that the first application execution screen is displayed on the display at step S117.

The predetermined time intervals can be set to the same time length about a few milli-seconds or a few seconds. The time interval can be changed in length depending on the system design or a user's settings.

The mobile terminal can be configured to skip at least one of steps S201 to S207 depending on the system design or user's settings. For instance, the mobile terminal can skip step S205 so as to display the downsized first application image at step S207 right after the downsized second application image appears at step S203. Also, the mobile terminal can skip steps S203 and S207 so as to display the first application execution screen at step S117 after the downsized first application and the task window are displayed at steps S201 and S205 in series.

As described above, when a command for activating a first application running in the background is detected while a second application is running in the foreground, the mobile terminal displays the task window in the middle of transitioning from the first application execution screen to the second application execution screen in order to advice the user of all of the applications that are currently running. Since the first and second application execution screens are displayed in the form of downsized application images within the task window, the user is made aware of the running applications in an intuitive and revealing manner in which the execution screen of the deactivated application is diminished into the downsized application image and the downsized application image of the activated application is enlarged into the application execution screen.

Since the mobile terminal controls processing such that the execution screen of the newly activated application is displayed after the presentation of its downsized application image according to a predetermined setting rather than abruptly right after the disappearance of the execution screen of the deactivated application and the execution screen of deactivated application disappears after the presentation of its downsized application image, the user experiences a smooth switching between application execution screens of the activated and deactivated applications. As a consequence, the user can collect the revealing information about visual transitions and perceive the progression of the transition of applications between the foreground and the background. Also, the user can have the pre-perception on the information to acquire and erase from the memory through the animation effect of the stepwise appearance and disappearance of the application execution screens with the task window showing the downsized application images, resulting in flexibility of information collection and understanding.

Figure 3:
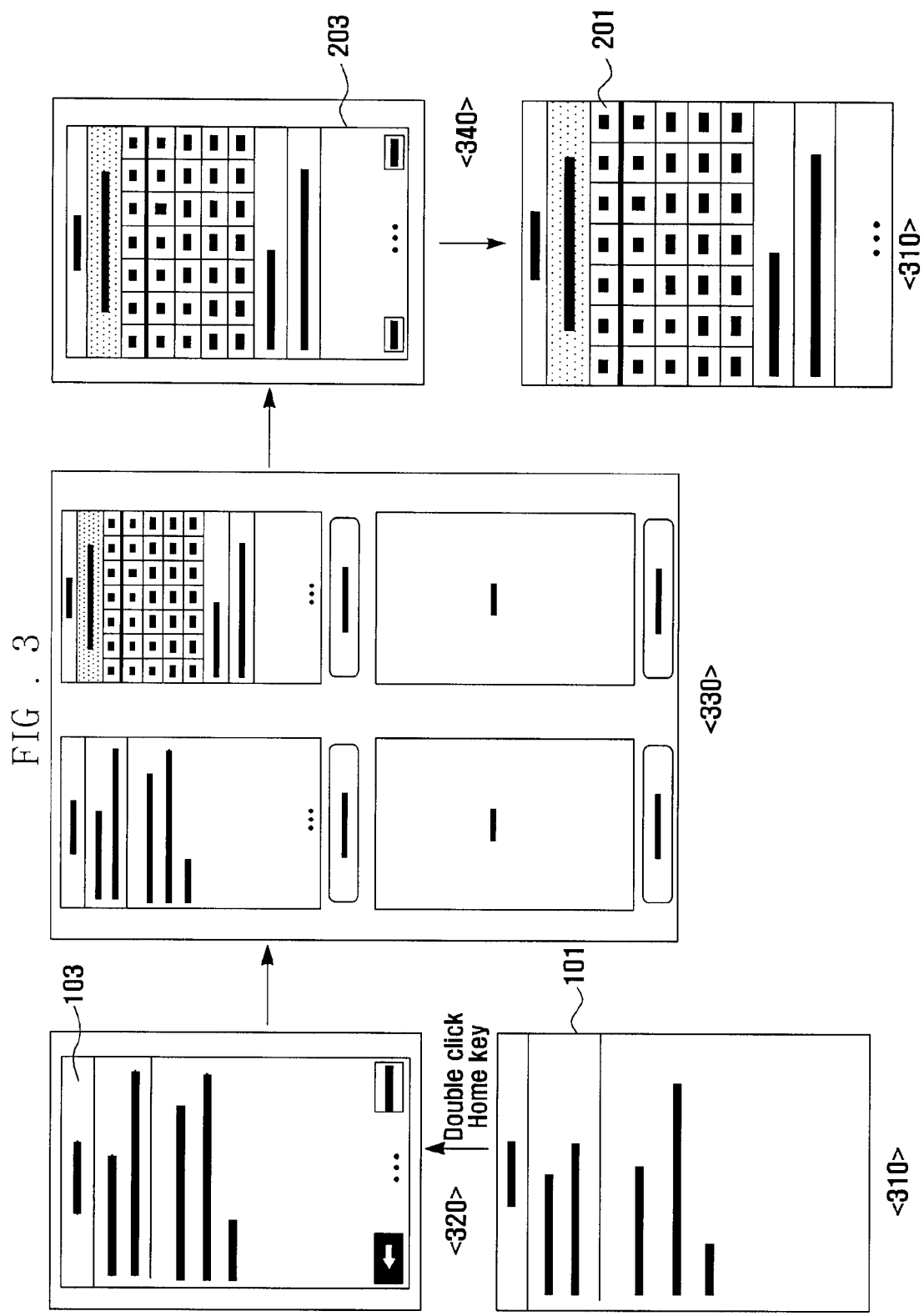
FIG. 3 is a diagram illustrating screenshots associated with steps of the execution screen switching process of a mobile terminal according to an exemplary embodiment of the present invention.

FIG. 3 is a diagram illustrating screenshots associated with steps of the execution screen switching process of a mobile terminal according to an exemplary embodiment of the present invention.

Referring to FIG. 3, the mobile terminal can control the processing to activate an application (e.g. text messaging application) running in the background in response to a user's menu selection or key input. For example, when an incoming message is received while a specific application is running on the foreground, the user can activate the text messaging application (first application) running in the background by selecting an incoming message indication icon or a menu item designated for activating the text messaging application presented on the display screen. If the user command for activating the text messaging application is detected, the mobile terminals activates the text messaging application in response to the user command and displays the text messaging application execution screen (first application execution screen), i.e. the incoming message window, as denoted by reference numeral 310.

While reading the content of the incoming message, the user may need to activate another application (e.g. calendar application) for checking schedules. Assuming that the calendar application (second application) is not activated but running in the background, the mobile terminal can activate the calendar application (second application) and display the calendar application execution screen (second application execution screen) as denoted by reference numeral 350 in the foreground in response to a user command.

The mobile terminal can be configured to receive the user command input in different ways. For example, the user can input a quick application switching command by using a specific key (e.g. home key) of the mobile terminal. That is, the user can input the quick application switching command by double tapping the home key allocated to a specific area of the touchscreen (home key double tapping). In case that the mobile terminal is equipped with a motion sensor, the user can input the quick application switching command with a specific motion of the mobile terminal that is designated for quick application switching. Also, in case that a hot key is designated for the quick application switching, the user can input the quick application switching command by means of the hot key. The user can input the quick application switching command by taking one of the actions designated for the quick application switching operation.

If the quick application switching command is detected while the first application execution screen 310, the mobile terminal displays a series of transition screens 320, 330, and 340 and the second application execution screen 350 in stepwise manner.

In more detail, if the quick application switching command is detected while the first application screen 310 is displayed, the mobile terminal captures the first application execution screen as a first application execution screen image 101 and reduces the first application execution screen image 101 into an intermediate image 103 as shown in the first transition screen 320. At this time, the mobile terminal can control processing such that the first application execution screen image 101 is reduced into the intermediate image 103 which is a predetermined portion of the overall display area. Also, the mobile terminal can control processing to create the intermediate image 103 through a separate process, e.g. a background process, which removes the first application execution image 101, and displays the intermediate image 103. By presenting the first application execution screen image 101 and the intermediate image 103 of the first application execution screen in series, the user can perceive a zoom-out effect. Accordingly, the intermediate image 103 is displayed along with a partially exposed background image as shown in the screen 320.

Also, the mobile terminal can control processing such that the intermediate image appears for a predetermined time (e.g. a few milliseconds to a few seconds) and then is replaced by the task window 301 as denoted by reference numeral 330. The task window 301 is the window for displaying all of the applications running in both the foreground and background in the form of thumbnail images. The user can be aware of the applications running on both the foreground and background through the task window. The thumbnail images presented on the task window are smaller than the intermediate images of the corresponding application execution screen images and vary in size according to the number of the currently running applications. The mobile terminal can divide the task window into a plurality of frames according to the number of the currently running applications. For example, if two applications are running currently, the mobile terminal can divide the task window into two frames and display the thumbnail images of the two applications in the respective frames. Also, the mobile terminal can divide the task window into a predetermined number of frames regardless of the number of the currently running applications such that the thumbnail images fill the frames in order the order of their execution. For example, if the mobile terminal is configured to divide the task window into four frames and if two applications are running currently, the two thumbnail images of the applications are presented in the first two frames while the other two frames remain empty, as illustrated.

The mobile terminal can be configured such that the intermediate image 103 of the first application execution screen 310 moves from the center to the left or right edge of the screen to disappear out of the screen and then the task window screen 330 replaces the first application execution screen 310. Also, the mobile terminal can be configured such that an intermediate task window is created in the same size as the intermediate image 103, while the intermediate image 103 moves in a direction to disappear from of the screen. The intermediate task window is displayed at the center of the screen for a predetermined time and then is replaced by a full screen task window as shown in the task window screen 330.

The task window 301 disappears from the screen after the predetermined time has elapsed. Next, the mobile terminal controls processing such that the intermediate image 203 of the second application execution screen is displayed at an area on the display as denoted by reference numeral 340. At this time, the mobile terminal can display the intermediate image 203 of the second application execution screen along with a partial exposure of the background image. The mobile terminal also can control processing such that the intermediate image 203 of the second application execution screen emerges from an edge to the center of the screen or appears at the center as a dot and enlarges gradually to a predetermined size.

The mobile terminal can perform the process for displaying the intermediate image 203 of the second application execution screen in the intermediate image screen 340 in association with a process for displaying the task window 301 in the task window screen 330. That is, the mobile terminal is configured such that an intermediate task window having the same size as the intermediate image 203 of the second application execution screen is created, while the intermediate image 203 moves in a direction to disappear, and emerges while moving in the same direction as the intermediate image 203. Here, the intermediate task window can be identical with the intermediate image 203 in size.

After displaying the intermediate image of the second application execution screen image 203 for a predetermined time interval, the mobile terminal displays the second application execution screen image 201 as denoted by reference numeral 350. By presenting the intermediate image 203 and the second application execution screen image 201 of the second application execution screen in series, the user can perceive a zoom-in effect.

As described above, the mobile terminal according to an exemplary embodiment of the present invention displays the intermediate images of the execution screens of the applications switching between foreground and background modes and the task window presenting the thumbnail images of the currently running applications in the middle of switching between two applications, whereby the user can perceive the information about each of the running applications while switching the applications between foreground and background.

Figure 4:
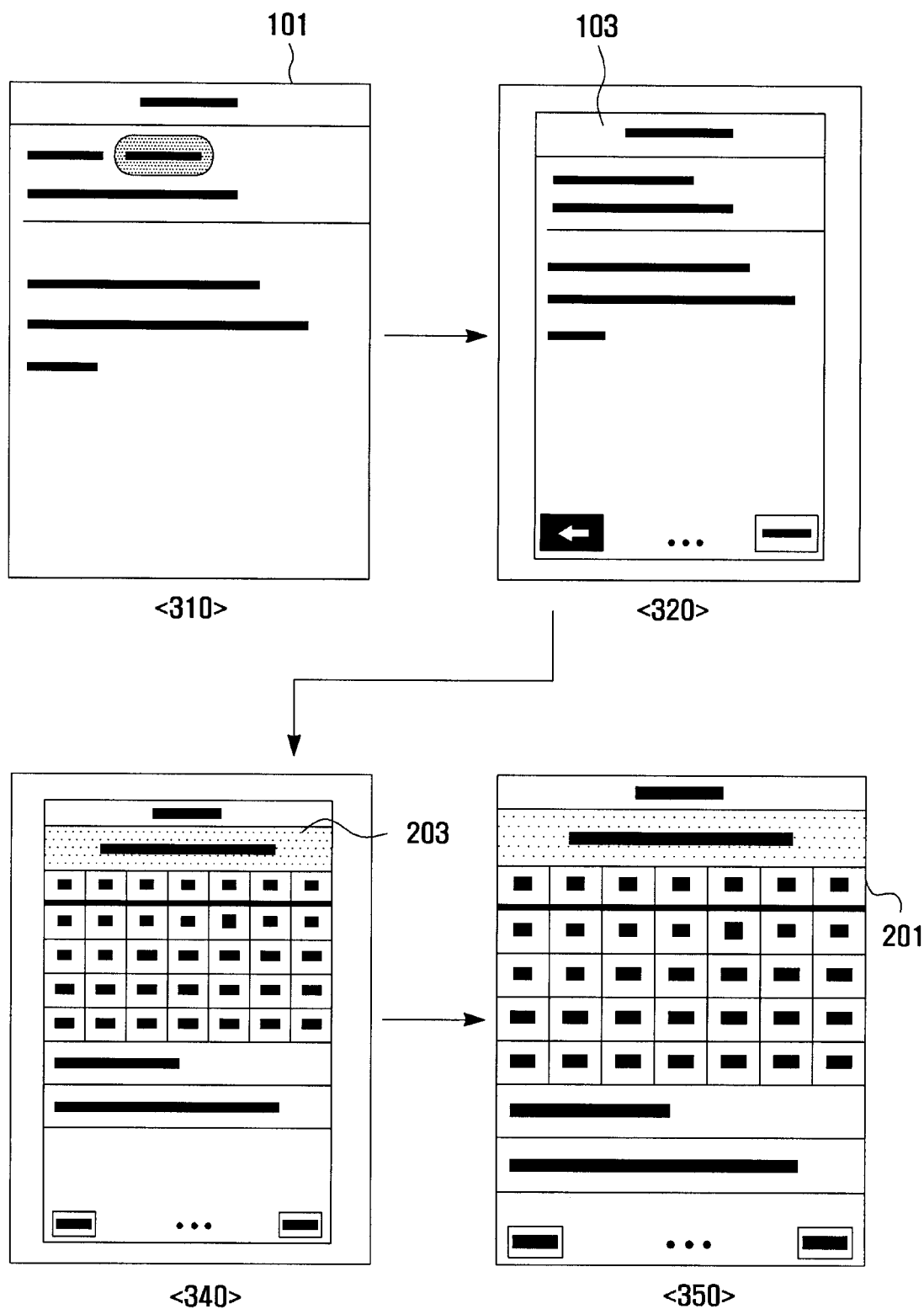
FIG. 4 is a diagram illustrating screenshots associated with steps of the execution screen switching process of a mobile terminal according to another exemplary embodiment of the present invention.

FIG. 4 is a diagram illustrating screenshots associated with steps of the execution screen switching process of a mobile terminal according to another exemplary embodiment of the present invention.

Referring to FIG. 4, the mobile terminal can control processing to activate an application (e.g. text messaging application) in response to a user's menu selection or key input. For example, when an incoming message is received while a specific application in running in the foreground, the user can activate the text messaging application running in the background by selecting an incoming message indication icon or a menu item designated for activating the text messaging application presented on the display screen. If the user command for activating the text messaging application is detected, the mobile terminals activates the text messaging application in response to the user command and displays the text messaging application execution screen, i.e. the incoming message window, as denoted by reference numeral 310.

While reading the content of the incoming message, the user may need to activate another application (e.g. calendar application) for checking schedules. Assuming that the calendar application (second application) is not activated but running in the background, the mobile terminal can activate the calendar application and display the calendar application execution screen (second application execution screen) as denoted by reference numeral 350 in the foreground in response to a user command.

The user can input a command in various manners. For example, the user can input a quick application switching command by using a specific key (e.g. home key) of the mobile terminal. That is, the user can input the quick application switching command by double tapping the home key allocated to a specific area of the touchscreen (home key double tapping). In case that the mobile terminal is equipped with a motion sensor, the user can input the quick application switching command with a specific motion of the mobile terminal that is designated for quick application switching. Also, in case that a hot key is designated for the quick application switching, the user can input the quick application switching command by means of the hot key. The user can input the quick application switching command by taking one of the actions designated for the quick application switching operation.

If the quick application switching command is detected while the first application execution screen is displayed as denoted by reference numeral 310, the mobile terminal displays a series of transition screens as denoted by reference numerals 320 and 340 in stepwise manner and then displays the second application execution screen as denoted by reference numeral 350.

In more detail, if the quick application switching command is detected while the first application screen 301 is displayed, the mobile terminal captures the first application execution screen as a first application execution screen image 101 and reduces the first application execution screen image 101 into an intermediate image 103 as shown in the transition screen 320. Accordingly, the intermediate image 103 is displayed along with a partially exposed background image as shown in the screen 320.

Also, the mobile terminal can control processing such that the intermediate image 103 moves in a direction, e.g. left direction, to disappear from of the screen while changing from the transition screen 320 to the transition screen 340. Right after the disappearance of the intermediate image 103 of the first application execution screen (text messaging application execution screen), the mobile terminal can control the processing to display an intermediate image 203 of the second application execution screen (calendar application execution screen) (see screen 340). At this time, the mobile terminal can control the processing such that the intermediate image 203 of the second application execution screen emerges from an edge to the center of the screen. That is, the mobile terminal controls such that the intermediate image 203 of the second application execution screen appears from an edge to the center right after the intermediate image 103 of the first application execution screen disappears in a predetermined direction. Also, the mobile terminal can control the processing such that the intermediate image 203 of the second application execution screen emerges at the center of the screen as a dot and enlarges gradually to a predetermined size. Accordingly, the intermediate image 203 displayed along with a partially exposed background image as shown in the transition screen 340.

The mobile terminal displays the transition screen 340 for a predetermined time interval and, after the predetermined time interval has elapsed, the second application execution screen as denoted by reference numeral 350 is displayed. By displaying the transmission screen 340 presenting the intermediate image 203 and the second application execution screen 350 presenting the full screen image 201 in series, the user can perceive a zoom-in effect.

As described above, the mobile terminal according to an exemplary embodiment of the present invention displays the intermediate images of the execution screens of the applications switching between the foreground and the background, whereby the user can perceive the information on the activation and deactivation of the applications.

Figure 5:
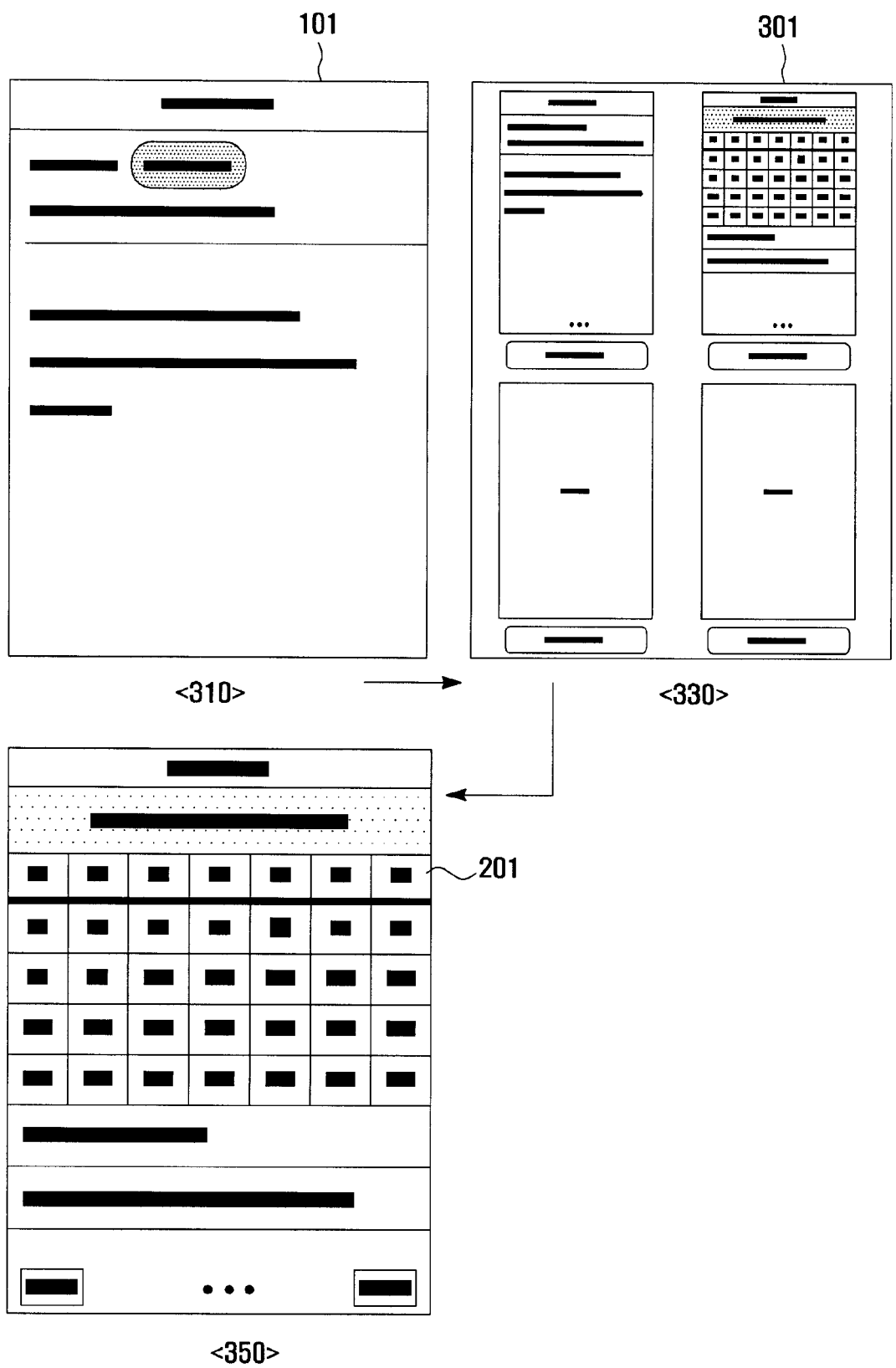
FIG. 5 is a diagram illustrating screenshots associated with the steps of the execution screen switching process of a mobile terminal according to an exemplary embodiment of the present invention.

FIG. 5 is a diagram illustrating screenshots associated with the steps of the execution screen switching process of a mobile terminal according to an exemplary embodiment of the present invention.

Referring to FIG. 5, the mobile terminal can control the processing to activate an application (e.g. text messaging application) in response to a user's menu selection or key input. For example, when an incoming message is received while a specific application in running in the foreground, the user can activate the text messaging application running in the background by selecting an incoming message indication icon or a menu item designated for activating the text messaging application presented on the display screen. If the user command for activating the text messaging application is detected, the mobile terminals activates the text messaging application in response to the user command and displays the text messaging application execution screen, i.e. the incoming message window, as denoted by reference numeral 310.

While reading the content of the incoming message, the user may need to activate another application (e.g. calendar application) for checking schedules. Assuming that the calendar application (second application) is running in the background, the mobile terminal can activate the calendar application and display the calendar application execution screen (second application execution screen) as denoted by reference numeral 350 in the foreground in response to a user command.

The user can input a command in various manners. For example, the user can input a quick application switching command by using a specific key (e.g. home key) of the mobile terminal. That is, the user can input the quick application switching command by double tapping the home key allocated to a specific area of the touchscreen (home key double tapping). In case that the mobile terminal is equipped with a motion sensor, the user can input the quick application switching command with a specific motion of the mobile terminal that is designated for quick application switching. Also, in case that a hot key is designated for the quick application switching, the user can input the quick application switching command by means of the hot key. The user can input the quick application switching command by taking one of the actions designated for the quick application switching operation.

If the quick application switching command is detected while the first application execution screen 310 is displayed, the mobile terminal displays a transition screen 330 on the display as a replacement of the first application execution screen 310.

In more detail, if the quick application switching command is detected while the first application execution screen 310 is displayed, the mobile terminal controls the processing such that the first application execution screen image 101 disappears and the transition screen 330, having a task window 301, is displayed on the display for a predetermined time interval. The task window is the window presenting the thumbnail images of the execution screens of at least one currently running application. The user is thus made aware of the applications running in both the foreground and background through the task window. Preferably, the thumbnail image is smaller than the aforementioned intermediate image of the application execution screen and can be changed in size according to the number of the currently running applications. The mobile terminal can divide the task window into a plurality of frames according to the number of the currently running applications. For example, if two applications are running currently, the mobile terminal can divide the task window into two frames and display the thumbnail images of the two applications in the respective frames. Also, the mobile terminal can divide the task window into a fixed number of frames regardless of the number of the currently running applications such that the thumbnail images are filled the frames in order. For example, in the illustrated embodiment shown, if the mobile terminal is configured to divide the task window into four frames and if two applications are running currently, the two thumbnail images of the applications are presented in the first two frames while the other two frames remain empty.

The mobile terminal can control the processing to display the transition screen 330 presenting the task window 301 for a predetermined time interval and, after the predetermined time has elapsed, the second application execution screen 350 corresponding to the second application (calendar application) is displayed.

The display management methods according to some exemplary embodiments of the present invention have been described with reference to exemplary screen images of a mobile terminal hereinabove. A description is made of the structure of the mobile terminal for supporting the display management method according to the embodiments of the present invention hereinafter.

Figure 6:
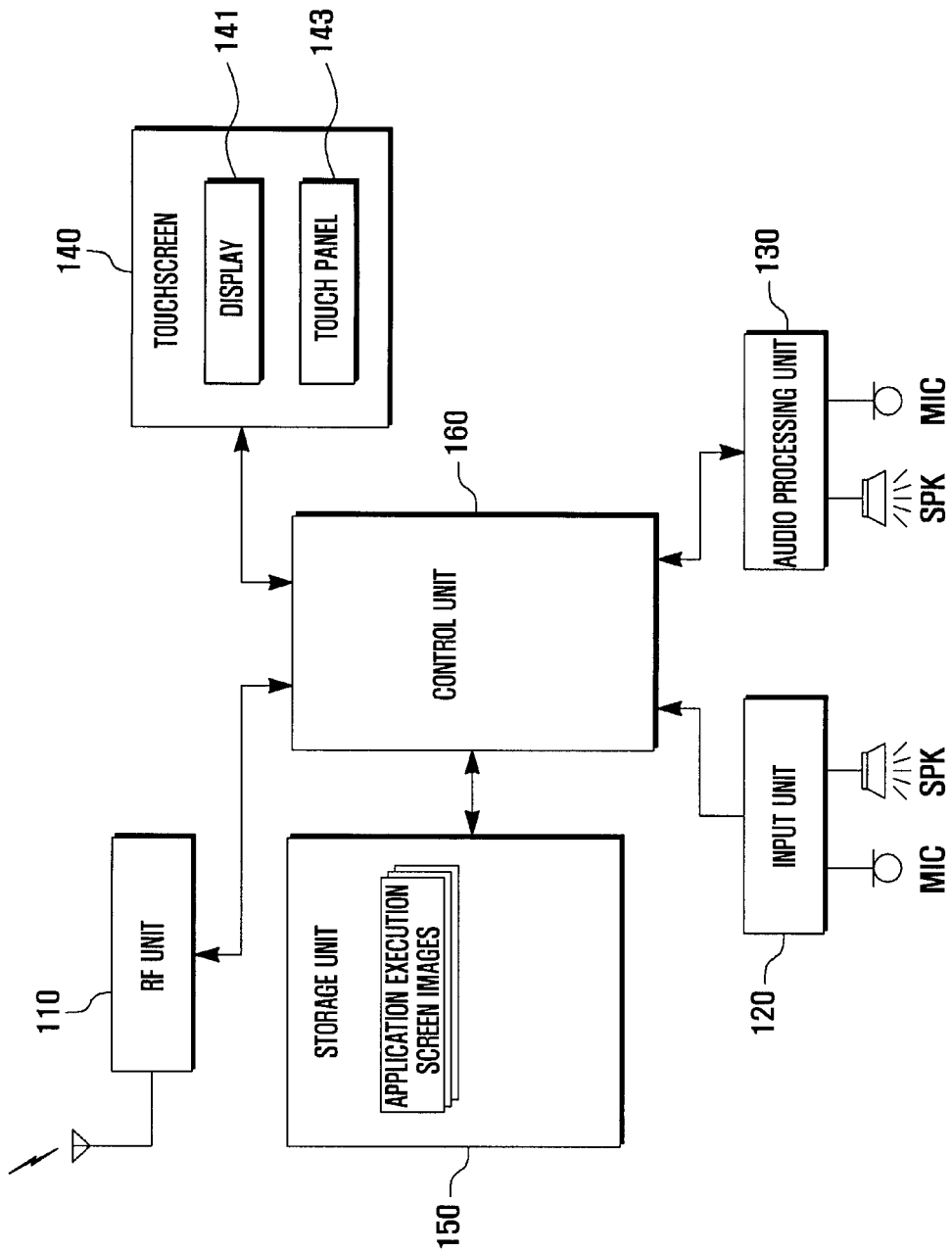
FIG. 6 is a block diagram illustrating the configuration of a mobile terminal according to an exemplary embodiment of the present invention.

FIG. 6 is a block diagram illustrating the configuration of a mobile terminal according to an exemplary embodiment of the present invention.

As shown in FIG. 6, the mobile terminal includes a Radio Frequency (RF) unit 110, an input unit 120, an audio processing unit 130, a touchscreen 140, a storage unit 150, and a control unit 160. The touch screen 140 includes a display 141 and a touch panel 143.

The mobile terminal executes at least one of the applications stored within the storage unit 150 in response to a user command. One of executed application is running in the foreground according to the user's selection while other executed applications are running in the background. If an application switching command is input by the user to activate one of the background running applications while the execution screen of the foreground running application is displayed on the display 141, the execution screens of the foreground running application and the selected background running application are processed into full-screen execution screen images and intermediate image that are smaller than the full-screen execution screen images such that the full-screen execution screen image and intermediate image of the foreground running application and the intermediate image and full-screen execution screen image of the selected background running application are displayed in stepwise manner. Between the presentations of the intermediate image of the foreground running application and the intermediate image of the selected background running application, a task window presenting the thumbnail images of the applications running on the foreground and background can be displayed. The internal function blocks of the mobile terminal are described hereinafter in relation with this application switching operation between the foreground and the background.

The RF unit 110 is responsible for establishing a radio channel for voice and data communication under the control of the control unit 160. That is, the RF unit 110 establishes a voice, data, or video communication channel with a mobile communication system. For this purpose, the RF unit 110 includes an RF transmitter for up-converting and amplifying transmission radio signals and an RF receiver for low noise amplifying and down-converting received radio signals. The RF unit 110 operates under the control of the control unit 160 in response to the user command input by means of the touch panel 143. Particularly in an exemplary embodiment of the present invention, the RF unit 110 can be configured to be activated under control of the control unit 160 when a user-requested function screen, such as a phonebook screen, a message composition screen, an email composition screen, a communication log screen, and a messenger screen is displayed.

The input unit 120 is provided with a plurality of alphanumeric keys (not shown) for receiving alphabetic and numeric data and function keys for setting and executing various functions of the mobile terminal. The function keys can include navigations keys, side keys, and shortcut keys. The input unit 120 generates a key sequence for setting and controlling the functions of the mobile terminal and transfers the key sequence to the control unit 160. The input unit can be implemented with one of a QWERTY keypad, a 3*4 keypad, and a 4*3 keypad. In case that the touchscreen 140 of the mobile terminal is implemented in the form of a full touch screen, the key section of the input unit 120 can be replaced by the touchscreen 140. Particularly in an exemplary embodiment of the present invention, the input unit 120 can be configured to generate a key sequence for the quick application switching in response to a user input while multiple applications are running in the mobile terminal and transfers the key sequence to the control unit 160. In case that the mobile terminal is equipped with at least one of an acceleration sensor, a tilting sensor, a gyro sensor, a pressure sensor, and an approach sensor, these sensors can be included in the input unit 120. In this case, the sensing result of each sensor is transferred to the control unit 160 and can be used as the quick application switching command.

The audio processing unit 130 includes a speaker (SPK) for outputting the incoming and outgoing audio data of the a voice call in the form of audible sound wave and a microphone (MIC) for converting sound such as user voice to the audio data. The audio processing unit 130 can be configured to output a sound effect for indicating the quick application switching operation of the mobile terminal. For example, when the full-screen application execution screen image of the foreground running application is replaced by the corresponding intermediate image, the audio processing unit 130 can output a sound effect preset for this image changing event. Also, when the intermediate image of the selected background running application is replaced by the corresponding full-screen application execution screen image, the audio processing unit 130 can output a sound effect preset for this image changing event. Also, when the task window is presented on the display, the audio processing unit 130 can output a sound effect preset for the task window presentation event.

The touchscreen 140 includes a display 141 and a touch panel 143. The touchscreen 140 can be implemented by laminating the touch panel 143 on the front surface of the display. The size of the touchscreen 140 can be determined by the size of the touch panel 143.

The display 141 displays the menus for manipulating the mobile terminal, data input by the user, and information indicating operation status of the mobile terminal. That is, the display 141 displays various screens associated with the operations of the mobile terminal such as idle mode screen, menu screen, message composition screen, and call progress screen. Particularly in an exemplary embodiment of the present invention, the display 141 can display the execution screen of the foreground running application, the transition screen presenting the intermediate image of the foreground running application which is downsized in a predetermined proportion, and the task window presenting the thumbnail images of the applications running in the mobile terminal. The display 141 also can display the progression of change from the full-screen application execution screen image to the intermediate image or from the intermediate image to the full-screen application execution screen image during the quick application switching operation, as previously shown. The display 141 also can display the task window between the presentations of the intermediate images of the foreground running application and background running application. The display 141 can be implemented with a Liquid Crystal Display (LCD) or an Organic Light Emitted Diode (OLED). The display 141 can be smaller than the touch panel 143 in size and arranged below the touch panel 143.

The touch panel 143 is arranged to cover the surface of the display 141 and generates a touch event when a contact or an approach of an object is detected thereon. The touch event is transferred to the control unit 160. The touch panel 143 is implemented in the form of a matrix such that, when a touch event is detected, it transfers the information regarding the location and type of the touch event to the control unit 160. The touch events include a touch-down event which occurs by making a contact on the touch panel 143, a touch-up event which occurs by lifting the contact, a touch movement or touch drag event which occurs by moving the contact, and a flick event which occurs by moving the contact in a direction with an acceleration motion. The control unit 160 checks the location and type of the touch event based on the signal transmitted by the touch panel 143 and the image mapped to the location on the display and executes a function (application) linked to the image.

The storage unit 150 stores the application programs for implementing the display management method according to exemplary embodiments of the present invention and key maps and menu maps for the touchscreen. The key maps and menu maps can be implemented in various forms. The key maps include a keyboard map, a 3*4 key map, a QWERTY key map, and a control key map for controlling the currently running application. The menu maps include the control menu map for controlling the currently running application and a hierarchical menu map composed of various menu items associated with the functions of the mobile terminal. The storage unit 150 can include a program region and a data region.

The program region stores the Operating System (OS) for booting the mobile terminal and managing and coordinating the operations of the application programs, such as a call application for making a call, a web browsing application for accessing a web server, a MP3 application for playing audio file, a image processing application for presenting still images, such as photos, and video playback application for playing motion pictures. Particularly in an exemplary embodiment of the present invention, the storage unit 150 stores a touchscreen control application which detects a touch event for the quick application switching command and transfers the touch event to the control unit 160. The program region also stores the task management control routine for supporting the task window. The task management control routine allows creating thumbnail images of the execution screens of the currently running applications and arranges the thumbnail images in the task window. If a specific user input, e.g. quick application switching command, is detected, the task management routing controls the processing such that the task window is presented for a predetermined time interval. In an exemplary embodiment of the present invention, the program region can store an image processing routine. The image processing routine can include a foreground application screen removal routine, a foreground application intermediate image presentation routine, a foreground intermediate image removal routine, a selected background application intermediate image presentation routine, and a selected background application screen. The image processing routine can control processing to present the task window having the thumbnail image of the currently running applications in cooperation with the task management routine.

The data region stores the application and user data such as phonebook data, icons representing widgets and applications, and various multimedia contents. In case that the touchscreen 140 is used as a part of the input unit 120, the data region can store the user commands input by means of the touchscreen 140. Particularly in an exemplary embodiment of the present invention, the data storage also can store the full-screen images and intermediate images of the currently running applications and a task window image having the thumbnail images of the currently running applications and supplies theses images to the display 141 under the control of the control unit 160.

The control unit 160, which includes a processor (not shown) controls a power supplied to the illustrated internal function blocks to initialize their functions and controls signaling among the function blocks for supporting the quick application switching operation of the mobile terminal. The control unit 160 controls the creation of the execution screen images of the running applications according to the image processing routing and task management control routine stored in the program regions of the storage unit 150 to provide the graphic user interface related to the quick application switching operation.

As described above, the display management method and system of a mobile terminal according to the present invention is capable of providing the user with the indications of the currently running application in an intuitive and revealing manner when switching between a foreground running application and a user-selected background running application, whereby the user can perceive information about the running states of the applications and predict the future operations.

The above-described methods according to the present invention can be realized in hardware or as software or computer code that can be stored in a recording medium such as a CD ROM, an RAM, a floppy disk, a hard disk, or a magneto-optical disk or downloaded over a network (i.e., The computer program can be provided from an external source which is electronically downloaded over a network, e.g., Internet, POTS), so that the methods described herein can be rendered in such software using a general purpose computer, or a special processor or in programmable or dedicated hardware, such as an ASIC or FPGA. As would be understood in the art, the computer, the controller, processor or the programmable hardware includes memory components, e.g., RAM, ROM, Flash, etc. that may store or receive software or computer code that when accessed and executed by the computer, processor or hardware implement the processing methods described herein. The code when loaded into a general purpose computer transformed the general purpose computer into a special purpose computer that may in part be dedicated to the processing shown herein. In addition, the computer, controller, processor or dedicated hardware may be composed of at least one of a single processor, a multi-processor, and a multi-core processor.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims. For example, while the embodiment of the invention described herein, refers to transition of the screen images by directing one image to a screen edge and the second image from the screen edge to the center, it would be recognized that other transition features, such as fade out/fade in, image replacement and a scrolling function may also be incorporated without altering the scope of the invention.

What is claimed is:

1. A method of displaying an activation screen switching process of a mobile terminal, comprising:
    displaying on a display unit a first execution screen of a first application;
    in response to sensing a tilt of the mobile terminal, determining that the sensed tilt comprises a quick application switch command for displaying a second execution screen corresponding to a second application;
    replacing the first execution screen on the display unit with a first intermediate screen having an image obtained by downsizing an image presented in the first execution screen in which the first intermediate screen displays at a reduced size an entirety of the first execution screen;
    replacing the first intermediate screen with a second intermediate screen having an image obtained by downsizing an image presented in the second execution screen in which the second intermediate screen displays at a reduced size only an entirety of the second execution screen for a predetermined time interval;
    replacing the second intermediate screen with the second execution screen of the second application;
    obtaining a zoom-in effect by displaying an intermediate image of the second intermediate screen showing a reduced size of a single screen image for the predetermined time interval, then displaying a second application screen displaying a full screen image in sequence;
    presenting a task window having thumbnail images of at least the first and second intermediate images in a sequential order on the display after erasing the first execution screen;
    presenting the task window on the display after erasing the first execution screen;
    erasing the task window after a predetermined time interval; and
    presenting the second execution screen after erasing the task window.

2. The method of claim 1, wherein the thumbnail images are smaller in size than the first and second intermediate images.

3. The method of claim 1, wherein replacing the second intermediate screen further comprises:
    presenting an intermediate task window image which is identical with the first intermediate image in size before presenting the task window for the predetermined time interval; and
    presenting the intermediate task window image after erasing the intermediate task window.

4. A mobile terminal comprising:
    a display unit which displays an execution screen of an activated application;

a tilting sensor for sensing a tilt of the mobile terminal; and a control unit which controls processing to display a series of images to show a progress of switching between a first application running in foreground and a second application running in background selected in response to an input signal, wherein the control unit controls for replacing a first execution screen on a display unit with a first intermediate screen having an image obtained by downsizing an image presented in the first execution screen in which the first intermediate screen displays at a reduced size an entirety of the first execution screen and replacing the first intermediate screen with a second intermediate screen having an image obtained by downsizing an image presented in a second execution screen in which the second intermediate screen displays at a reduced size only an entirety of the second execution screen for a predetermined time interval, and replacing the second intermediate screen with the second execution screen of the second application, and wherein the control unit is further configured to:

determine that a sensed tilt by the tilting sensor comprises a quick application switch command to display the second execution screen corresponding to the second application; and obtain a zoom-in effect by controlling display of the second intermediate screen showing only a reduced size of a single screen image for the predetermined time interval, then displaying the second application screen displaying only a full screen image in sequence.

5. The mobile terminal of claim 4, wherein the display unit presents the first intermediate image, a task window having thumbnail images of at least the first and second intermediate images in a sequential order, and the second intermediate image in series for the predetermined time interval respectively, and thereafter displays the second execution screen.

6. The mobile terminal of claim 5, wherein the display unit presents the first intermediate image along with a background image around the first intermediate image and moves the first intermediate image to an edge of the display to disappear from the display.

7. The mobile terminal of claim 5, wherein the display unit moves the second intermediate image from an edge of the display to a center of the display, presents the second intermediate image along with a background image around the second intermediate image, and erases the second intermediate image after the second intermediate image remains at the center of the display for the predetermined time interval.

8. The mobile terminal of claim 4, wherein the display unit erases the first execution screen from the display, presents a task window on the display after erasing the first execution screen, erases the task window after a predetermined time interval, and presents the second execution screen after erasing the task window.

9. The mobile terminal of claim 8, wherein one or more thumbnail images are smaller in size than the first and second intermediate images.

10. The mobile terminal of claim 8, wherein the display unit presents an intermediate task window image which is identical with the first intermediate image in size before presenting the task window for the predetermined time interval and the intermediate task window image after erasing the task window.

11. The mobile terminal of claim 4, wherein the display unit presents the first intermediate image for a predetermined time interval, the second intermediate image for the predetermined interval, and the second execution screen respectively.

12. The mobile terminal of claim 11, wherein the display unit presents the first intermediate image along with a background image around the first intermediate image, moves the first intermediate image to an edge of the display to disappear from the display, moves the second intermediate image from an edge of the display to a center of the display, presents the second intermediate image along with the background image around the second intermediate image, and erases the second intermediate image from the display after the second intermediate image remains at the center of the display for the predetermined time interval.

13. The mobile terminal of claim 4, further comprising a touch panel which presents a key map for inputting the input signal and senses a touch event designated for generating the input signal on the key map.

14. A method of displaying an activation screen switching process of a user device, comprising:

displaying on a display unit a first execution screen of a first application;

receiving an input signal;

replacing the first execution screen on the display unit with a task window comprising a first image obtained by downsizing an image presented in the first execution screen and a second image obtained by downsizing an image in response to a second application in a running state, wherein the downsized image is an intermediate image larger than a thumbnail and in which the intermediate image is displayed at a reduced size an entirety of the first execution screen;

obtaining a zoom-in effect by displaying the intermediate image, second application screen showing only a reduced size of a single screen image for a predetermined time interval showing only the reduced size an entirety of the first execution screen for a predetermined time interval, then displaying a second application screen displaying only and a full screen image in sequence; and in response to sensing a tilt of the user device, determining that the sensed tilt comprises a quick application switch command for displaying a second execution screen corresponding to the second application.

15. The method of claim 14, further comprising displaying the second execution screen of the second application after deleting the task window.

16. The method of claim 14, wherein the second application is background running application.

17. The method of claim 14 wherein the task window is divided into a fixed number of frames regarding a number of currently running applications.

* * * * *